United States Patent Office 3,320,241
Patented May 16, 1967

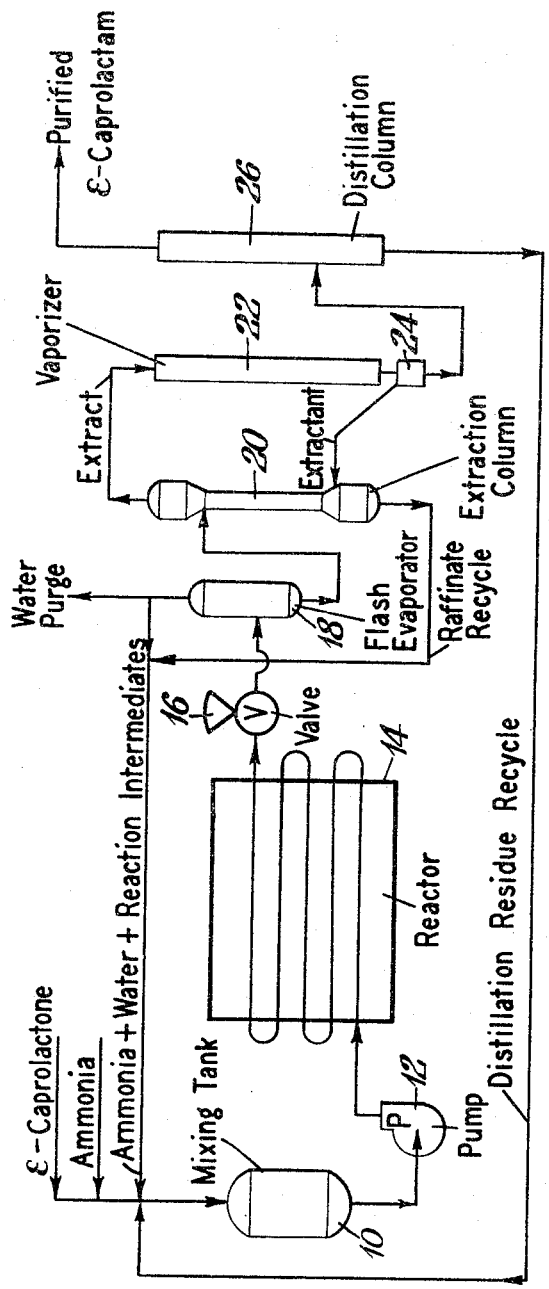

3,320,241
CONTINUOUS TWO-STAGE PROCESS FOR THE PRODUCTION OF EPSILON-CAPROLACTAM
Harold E. Kyle, St. Albans, and James H. Bricker, Jr., Charleston, W. Va., assignors to Union Carbide Corporation, a corporation of New York
Filed Mar. 15, 1965, Ser. No. 439,765
8 Claims. (Cl. 260—239.3)

This invention relates to the production of epsilon-caprolactam. More particularly, this invention relates to a continuous two-stage process for producing epsilon-caprolactam from epsilon-caprolactone in high yield and with minimum formation of by-products which cannot be converted to epsilon-caprolactam under the process conditions.

It is known to the art to produce epsilon-caprolactam by the reaction of epsilon-caprolactone with aqueous ammonia at superatmospheric pressures and elevated temperatures. Heretofore, however, this reaction has not been suited to commercial operation because of the relatively low yield per pass imposed by the reaction equilibria and because of the formation of large amounts of by-products which cannot be converted to the desired product. Because of the low yield per pass, recycling of reaction intermediates and unconverted starting materials is essential, but this is greatly complicated by the presence of the undesired by-products, whose removal from epsilon-caprolactam is accomplished only with great difficulty and whose formation seriously limits the overall yield of the process and, accordingly, makes operating costs prohibitively high.

The present invention provides a novel process for production of epsilon-caprolactam whereby the difficulties of the prior art referred to above are successfully overcome. Specificaly, there is provided a continuous two-stage process for converting epsilon-caprolactone to epsilon-caprolactam in high yield, wherein a first stage operated at a relatively low temperature is employed to effect formation of reaction intermediates and subsequently a second stage operated at a relatively high temperature is employed to effect conversion of the reaction intermediates to epsilon-caprolactam. By this means the formation of by-products which are not convertible to epsilon-caprolactam is held to an absolute minimum and recycle of the reaction intermediates to the reactor, where they are readily converted to epsilon caprolactam, can be successfully employed to achieve a high overall yield. As employed herein, the term "reaction by-product" is intended to include all reaction products which cannot be converted to epsilon-caprolactam under the process conditions, while the term "reaction intermediate" is intended to include all reaction products which can be so converted.

According to this invention, epsilon-caprolactone, ammonia and water are admixed in a first stage operated at relatively low temperatures for a period of time sufficient to effect substantial conversion of the epsilon-caprolactone to reaction intermediates and then the first stage reaction mixture so produced is permitted to undergo reaction in a second stage operated at the high temperatures and high pressures that are required to form epsilon-caprolactam. The epsilon-caprolactam is then separated from the unreacted starting materials and reaction intermediates, formed in the first and/or second stage reactions, and these are recycled to the first stage where they combine with the incoming feed. Since on being returned to the first stage the reaction intermediates pass through the entire two-stage process and are thereby converted to epsilon-caprolactam, such recycling results in a very high proportion of the epsilon-caprolactone in the feed being ultimately converted to product. The epsilon-caprolactam separated from the second stage reaction mixture is, of course, contaminated with impurities and musut be subjected to extensive purification procedures, but all residues resulting therefrom can also be recycled to the first stage and eventually recovered as product.

Two-stage operation as described above effectively avoids the formation of substantial amounts of reaction by-products, i.e. materials which cannot be converted to epsilon-caprolactam under the process conditions, such as are formed when the reaction is conducted in a single stage operation in accordance with the teachings of the prior art. The chief such by-product is delta-methyl-delta-valerolactam and this compound is produced in substantial amounts when the epsilon-caprolactone and ammonia feed is subjected directly to the high temperature, high pressure conditions required for formation of epsilon-caprolactam in accordance with the methods of the prior art, but is essentially eliminated by operating in accordance with this invention whereby the feed and recycle streams are admixed at relatively low temperatures and thereby form only reaction intermediates which are subsequently converted to epsilon-caprolactam without substantial formation of delta-methyl-delta-valerolactam. The predominant reaction intermediate formed in the first stage is 6-hyroxycaproamide, and this compound is readily converted to epsilon-caprolactam in the second stage reaction. Under optimum process conditions the overall result is that substantially none of the unwanted delta - methyl - delta-valerolactam is produced. Various other reaction intermediates are formed in the first and/or second stage reactions of this invention, such as poly (epsilon - caprolactone), poly(epsilon-caprolactam), 6-hydroxycaproic acid, 6-acetoxycaproic acid, epsilon-aminocaproamide, epsilon-aminocaproic acid, the ammonium salt of 6-hydroxycaproic acid, and the like. However, all of these materials are convertible to epsilon-caprolactam and since all are recycled to the reactor their formation results in no loss in overall yield.

The second stage of the present process comprises a high temperature, high pressure conversion of the complex mixture of reaction intermediates to epsilon-caprolactam. The feed to the second stage is, of course, the reaction mixture formed in the first stage of the process, while the product of the second stage is a crude epsilon-caprolactam rich stream from which purified epsilon-caprolactam is recovered. In accordance with this invention, the second stage reaction is carried out at temperatures of from about 300° C. to about 400° C., preferably from amout 335° C. to about 370° C., and pressures of at least about 2,000 p.s.i.g., preferably from about 2,500 p.s.i.g. to about 10,000 p.s.i.g., and more preferably from about 3,000 p.s.i.g. to about 5,000 p.s.i.g. The contact time for the second stage reaction may range from a few minutes to several hours, the only essential limitation being that the period be of sufficient duration to result in formation of epsilon-caprolactam. Contact times of from 20 to 90 minutes are preferred.

The reaction mixture from the second stage is subjected to conventional procedures for recovery of the epsilon-caprolactam, for example, the epsilon-caprolactam may be recovered by evaporation, extraction, recrystallization and distillation techniques, or various combinations thereof, and the residue remaining after removal of the epsilon-caprolactam is recycled to the first stage where it is admixed with the incoming feed. The recycle to the first stage may be made up of several separate streams, for example, ammonia and water separated from the second stage reaction mixture by flash evaporation, an extraction raffinate containing reaction intermediates such as polymerized epsilon-caprolactone and polymerized epsilon-caprolactam, and a residue from the final distillation steps in which the epsilon-caprolactam is purified.

The rate of feed to the first stage and the rate of recycle are controlled so as to maintain a concentration of reactants which provides minimum formation of unwanted reaction by-products which cannot be converted to epsilon-caprolactam under the process conditions, such as delta-methyl-delta-valerolactam. Thus, the first stage of the present process is operated so as to maintain a ratio of about 2 to about 12 moles of ammonia and about 3 to about 26 moles of water per mole equivalent of epsilon-caprolactone. All reaction intermediates convertible to epsilon-caprolactam under the process conditions are equivalents of epsilon-caprolactone for the purposes of this invention and hence the expression "per mole equivalent of epsilon-caprolactone" is employed herein and in the appended claims to make clear that the stated concentrations of ammonia and water are based upon epsilon-caprolactone plus reaction intermediates.

Operation in accordance with this invention maintains appropriate dilution of the epsilon-caprolactone and epsilon-caprolactone equivalents with ammonia and water at all times and thereby minimizes formation of by-products that cannot be converted to epsilon-caprolactam, such as delta-methyl-delta-valerolactam. It has been found that epsilon-caprolactone should be subjected to high temperatures only when adequate water and ammonia are present if the formation of delta-methyl-delta-valerolactam is to be avoided so that the epsilon-caprolactone feed should not be preheated before its admixture in stage one. Control of the concentration of ammonia and water is a critical feature of the present invention. Excessively low ratios of water to epsilon-caprolactone and its equivalents result in excesive formation of delta-methyl-delta-valerolactam. Operation at high ratios of ammonia to epsilon-caprolactone and its equivalents and low ratios of water to epsilon-caprolactone and its equivalents results in the formation of such large quantities of reaction intermediates that the amount of material that must be recycled becomes too great, so that even though the intermediates are convertible to epsilon-caprolactam operating costs become excessive. It is preferred to maintain a ratio of about 3 to about 5 moles of ammonia and about 5 to about 20 moles of water per mole equivalent of epsilon-caprolactone.

Since the purpose of two-stage operation in accordance with the present invention is to convert the epsilon-caprolactone to reaction intermediates under relatively low temperatures and subsequently convert the intermediates to epsilon-caprolactam under the high temperature, high pressure conditions of the second stage reaction, the residence time in the first stage must be sufficient to effect substantial conversion of the epsilon-caprolactone to reaction intermediates such as 6-hydroxycaproamide. Usually, all or substantially all of the epsilon-caprolactone will be converted to such a reaction intermediate in the first stage of the process. The residence time in the first stage may vary, depending on temperature, composition, etc., from a few minutes, e.g. 5 minutes, to several hours, e.g. 5 hours. A preferred procedure is to operate so as to produce an equilibrium mixture in the first stage since this results in minimum formation of unsaturated molecules such as delta-hexeneamide and delta-hexenoic acid which are precursors of the unwanted delta-methyl-delta-valerolactam.

In contrast with the temperatures of at least about 300° C. that are required in the second stage, the first stage must be operated at a temperature of below about 200° C. The first stage may be operated under any desired pressure as long as it is a pressure at least equal to the autogenous pressure. Particularly convenient conditions for operation of the first stage are temperatures from ambient to about 125° C. and pressures of about 50 p.s.i.g. to about 500 p.s.i.g., but any suitable conditions meeting the criteria set forth above, i.e. temperature below about 200° C. and pressure at least equal to autogenous pressure, may be employed.

The epsilon-caprolactone employed as feed in the process disclosed herein need not, of course, be a pure material, so that crude epsilon-caprolactone streams containing polymerized epsilon-caprolactone or compounds such as 6-acetoxycaproic acid are fully satisfactory for the purposes of this invention. However, if the feed contains compounds not convertible to epsilon-caprolactam these should be present in only very small amounts. The overall process involves continuous feeding of epsilon-caprolactone and ammonia to the first stage, with addition of water normally being necessary only at start up, and continuous withdrawal of epsilon-caprolactam as product. The ammonia may be added as aqueous ammonia, as liquid ammonia, or as gaseous ammonia which is dissolved in the first stage reaction mixture. Since water is formed in the reaction, continuous removal of water as a purge stream is ordinarily necessary, while removal of residues not convertible to epsilon-caprolactam as a residue purge may also be necessary in some instances.

As hereinafter employed, the term "single-pass yield" is defined as the number of moles of epsilon-caprolactam produced per mole of epsilon-caprolactone equivalents fed to the second stage reaction system times one hundred percent, the term "overall yield" is defined as the number of moles of epsilon-caprolactam produced per mole of epsilon-caprolactone fed times one hundred percent, and the term "productivity" is defined as pounds of epsilon-caprolactam produced per hour per foot$^3$ of second stage reactor volume. Within the ranges of operating variables described herein as preferred, the single-pass yield was found to be increased by use of higher pressures, longer contact times, higher ratios of water to epsilon-caprolactone plus equivalents, and lower ratios of ammonia to epsilon-caprolactone plus equivalents. The productivity was found to be increased by higher pressure, lower ratios of water and ammonia to epsilon-caprolactone plus equivalents, and lower contact times. The ratio of delta-methyl-delta-valerolactam to epsilon-caprolactam in the product was found to be strongly dependent on the interaction between contact time and temperature. Maximization of both single-pass yield and productivity occurs at temperatures of about 365° C. while second stage contact times of greater than about 65 minutes tend to decrease the yield. Through optimization of the operating variables and use of recycle overall yields of up to about 90 percent can be achieved.

The continuous two-stage process of this invention can be conducted in any suitable apparatus. A particularly convenient procedure is to carry out the first stage reaction in a mixing vessel and then pump the first stage reaction mixture to a high pressure, high temperature vessel functioning as a second stage reactor. The second stage reactor may be either a tubular or stirred reactor. If desired, however, the entire two-stage process could be carried out in a single tubular reactor having an initial section operating at low temperature serving as the first stage and a final section operating at high temperature serving as the second stage. As mentioned hereinbefore, any suitable method of recovering and purifying the epsilon-caprolactam product may be employed but whatever method is used all residue streams should be returned to the first stage for ultimate conversion to epsilon-caprolactam, with the possible exception of a purge of materials not convertible to epsilon-caprolactam.

The accompanying drawing illustrates a particular embodiment of the present invention. As shown in the drawing, epsilon-caprolactone and ammonia are continuously fed to mixing tank 10 operating at, for example, 100° C. and 50 p.s.i.g., where they are thoroughly mixed with incoming recycle streams and the resulting reaction mixture is continuously pumped by pump 12 to high pressure reactor 14 operating at, for example, 365° C. and 5,000 p.s.i.g. The product stream from reactor 14 is directed through a motor valve 16 which reduces the pressure and then to flash evaporator 18 where the decrease in pressure results in vaporization of most of the unreacted ammonia and water which is removed as an overhead stream and recycled to mixing tank 10, with a portion of the water being removed as a purge stream. The bottoms stream from flash evaporator 18 containing the epsilon-caprolactam and various reaction intermediates, which may, for example, be about 50 percent of the volume of the product stream from reactor 14, serves as the feed to extraction column 20. In extraction column 20, a continuous countercurrent liquid-liquid extraction is effected with the epsilon-carpolactam being recovered in an overhead extract stream and the reaction intermediates being removed from the bottom of extraction column 20 as a raffinate stream. The raffinate stream is recycled to mixing tank 10 while the overhead extract stream is fed to vaporizer 22 wherein the extractant is removed by vaporization and, following condensation in condenser 24, introduced to the bottom of extraction column 20 along with the incoming fresh extractant. The crude epsilon-caprolactam stream from vaporizer 22 serves as the feed to distillation column 26 which yields purified epsilon-caprolactam as an overhead stream and residues as a bottom stream which is recycled to mixing tank 10. In actual operation two or more vaporizers, operated in series, may be employed in place of vaporizer 22 and two or more distillation columns, operated in series, may be employed in place of distillation column 26.

Process variables

Operation of the two-stage process disclosed herein without recycle was utilized to establish the general effects of changes in process variables. Results of such runs are summarized for convenience in Table I below.

Consideration of the data presented in Table I indicates that operation of the process under the conditions hereinbefore set forth provides generally low ratios of delta-methyl-delta-valerolactam to epsilon-caprolactam in the product and that the formation of the unwanted by-product can be substantially eliminated by appropriate choice of operating conditions. In contrast with these results, operation under substantially the same conditions as in Runs I-2 and I-3 except for a change of ammonia to epsilon-caprolactone ratio to 3 and water to epsilon-caprolactone ratio to 30 resulted in a ratio of delta-methyl-delta-valerolactam to epsilon-caprolactam in the product of 0.946 while additionally changing the temperature to 457° C. resulted in a ratio of delta-methyl-delta-valerolactam to epsilon-caprolactam of 2.26.

Premixing

Runs II-1 through II-5, reported below in Table II, illustrate the importance of mixing the epsilon-caprolactone with water and ammonia before it is subjected to elevated temperatures. Runs II-1, II-2, and II-3 were carried out in accordance with the process of this invention with the feed streams, i.e. an epsilon-caprolactone stream and a 28% aqueous ammonia stream, being premixed in a first stage at room temperature and the mixture then being charged to the high temperature, high pressure second stage reactor. Runs II-4 and II-5 were carried out under substantially identical conditions to those of Runs II-1, II-2, and II-3 except that the epsilon-caprolactone and the 28% aqueous ammonia streams were each separately preheated to 367° C. and then charged directly to the high temperature, high pressure reactor.

TABLE II

|  | Run No. | | | | |
|---|---|---|---|---|---|
|  | II-1 | II-2 | II-3 | II-4 | II-5 |
| Temperature (° C.) | 365 | 366 | 367 | 366 | 367 |
| Pressure (p.s.i.g.) | 5,000 | 5,000 | 5,000 | 5,000 | 5,000 |
| Ammonia/$\epsilon$-caprolactone | 5 | 5 | 5 | 5 | 4.2 |
| Water/$\epsilon$-caprolactone | 26 | 26 | 26 | 26 | 24.4 |
| Contact time (min.) | 34.0 | 44.4 | 34.2 | 36.2 | 35.1 |
| Single-pass yield (percent) | 40.1 | 40.1 | 40.9 | 40.2 | 33.4 |
| Ratio of $\delta$-methyl-$\delta$-valerolactam to $\epsilon$-caprolactam in product | 0.047 | 0.079 | 0.089 | 0.170 | 0.293 |

Consideration of the above results indicates that operation of the process in accordance with the method of this

TABLE I

| Run Number | Temp. (° C.) | Pressure (p.s.i.g.) | Contact Time (min.) | Feed Mole Ratios | | Single-pass Yield (percent) | Productivity [1] | Ratio of MVL [2] to $\epsilon$-caprolactam in Product |
|---|---|---|---|---|---|---|---|---|
|  |  |  |  | Ammonia $\epsilon$-caprolactone | Water $\epsilon$-caprolactone |  |  |  |
| I-1 | 393 | 7,500 | 33.1 | 5 | 26 | 44.2 |  | 0.079 |
| I-2 | 385 | 7,500 | 27.2 | 5 | 26 | 40.3 |  | 0.057 |
| I-3 | 389 | 7,500 | 19.8 | 5 | 26 | 39.8 |  | 0.035 |
| I-4 | 394 | 7,500 | 12.8 | 5 | 26 | 36.0 |  | 0.032 |
| I-5 | 380 | 7,500 | 6.7 | 5 | 26 | 23.1 |  | [3] |
| I-6 | 392 | 9,500 | 43.8 | 5 | 26 | 31.8 |  | [3] |
| I-7 | 328 | 5,100 | 36.0 | 5 | 26 | 29.6 |  | 0.136 |
| I-8 | 370 | 7,500 | 41.4 | 10.2 | 3 | 30.0 | 2.75 | 0.113 |
| I-9 | 369 | 7,500 | 49.4 | 5.3 | 5 | 34.0 | 4.94 | 0.043 |
| I-10 | 375 | 7,500 | 53.9 | 2.8 | 5 | 23.4 | 4.11 | 0.048 |
| I-11 | 369 | 7,500 | 58.9 | 4.7 | 10 | 43.8 | 4.71 | 0.082 |
| I-12 | 369 | 7,500 | 40.8 | 11.9 | 26 | 38.6 | 2.78 | 0.019 |
| I-13 | 369 | 7,500 | 45.1 | 3 | 10 | 40.3 | 6.67 | [3] |
| I-14 | 364 | 7,500 | 20.7 | 2 | 26 | 40.9 | 9.11 | 0.153 |
| I-15 | 369 | 7,500 | 34.7 | 5.1 | 5 | 49.0 | 10.2 | 0.049 |
| I-16 | 367 | 7,500 | 17.2 | 3 | 10 | 30.8 | 13.4 | 0.046 |
| I-17 | 322 | 5,000 | 49.6 | 3 | 26 | 36.9 | 3.94 | [3] |
| I-18 | 320 | 9,000 | 67.6 | 3 | 10 | 37.2 | 4.49 | 0.035 |

[1] Lbs. of epsilon-caprolactam/hr./ft.$^3$ of reactor volume.
[2] $\delta$-Methyl-$\delta$-valerolactam.
[3] No detectable quantities of $\delta$-methyl-$\delta$-valerolactam.

invention results in substantially reduced formation of delta-methyl-delta-valerolactam, the average ratio of delta-methyl-delta-valerolactam to epsilon-caprolactam in the product in Runs II–1, II–2, and II–3, which employed premixing in accordance with this invention, being less than one third of that in Runs II–4 and II–5 which did not employ premixing.

*Recycle*

Recycle studies were conducted to demonstrate the applicability of the two-stage process of this invention to commercial operation. Average values for recycle tests extending over several days are reported below in Table III.

TABLE III

|  | Test III–1 | Test III–2 |
|---|---|---|
| Temperature (° C.) | 366 | 366 |
| Pressure (p.s.i.g.) | 5,000 | 9,000 |
| Ammonia/ε-caprolactone (¹) | 3 | 3 |
| Water/ε-caprolactone (¹) | 10 | 10 |
| Contact time (min.) | 40 | 20 |
| Single-pass yield (percent) | 32.4 | 24.2 |
| Productivity | 6.9 | 9.9 |
| Ratio of δ-methyl-δ-valerolactam to ε-caprolactam in product | 0.034 | 0.021 |
| Overall Yield (percent) (²) | 90.2 | 88.6 |

(¹) Ratio based on ε-caprolactone plus equivalents.
(²) Values reported are maximum obtained in particular test, with average values being somewhat lower because of losses in sampling.

Results reported in Table III demonstrate that the continuous two-stage process of this invention is capable of providing high productivities and high overall conversion of epsilon-caprolactone to epsilon-caprolactam with minimum formation of delta-methyl-delta-valerolactam.

The present invention is susceptible to various changes and modifications within the broad scope of the teachings set forth herein so that all such changes and modifications as would be apparent to one skilled in the art in light of the disclosure and examples provided herein are intended to be included within the scope of the appended claims.

What is claimed is:

1. A continuous two-stage process for producing epsilon-caprolactam from epsilon-caprolactone in high yield with minimum formation of by-products not convertible to epsilon-caprolactam under the process conditions which comprises (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 300° C. to about 400° C. and a pressure of at least about 2000 p.s.i.g. for a period of time sufficient to produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recyle and the rate of feed of the epsilon-caprolactone, ammonia and water being such as to maintain a ratio of about 2 to about 12 moles of ammonia and about 3 to about 26 moles of water per mole equivalent of epsilon-caprolactone in step (1).

2. A continuous two-stage process for producing epsilon-caprolactam from epsilon-caprolactone in high yield with minimum formation of by-products not convertible to epsilon-caprolactam under the process conditions which comprises (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 300° C. to about 400° C. and a pressure of from about 2,500 p.s.i.g. to about 10,000 p.s.i.g. for a period of time sufficient to produce epsilon-caprolactam, (3) continuously recovering the epsilon-caprolactam from the reaction produce of step (2) to leave a residue comprising ammonia, water and reaction intermediates, and (4) continuously recycling said residue for admixture in step (1), the rate of cycle and the rate of feed of the epsilon-caprolactone, ammonia and water being such as to maintain a ratio of about 2 to about 12 moles of ammonia and about 3 to about 26 moles of water per mole equivalent of epsilon-caprolactone in step (1).

3. A continuous two-stage process for producing epsilon-caprolactam from epsilon-caprolactone in high yield with minimum formation of by-products not convertible to epsilon-caprolactam under the process conditions which comprises (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 300° C. to about 400° C. and a pressure of from about 2,500 p.s.i.g. to about 10,000 p.s.i.g. for a period of about 20 minutes to about 90 minutes to thereby produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recycle and the rate of feed of the epsilon-caprolactone, ammonia and water being such as to maintain a ratio of about 2 to about 12 moles of ammonia and about 3 to about 26 moles of water per mole equivalent of epsilon-caprolactone in step (1).

4. A continuous two-stage process for producing epsilon-caprolactam from epsilon-caprolactone in high yield with minimum formation of by-products not convertible to epsilon-caprolactam under the process conditions which comprises (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 335° C. to about 370° C. and a pressure of from about 2,500 p.s.i.g. to about 10,000 p.s.i.g. for a period of about 20 minutes to about 90 minutes to thereby produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recycle and the rate of feed of the epsilon-caprolactone, ammonia and water being such as to maintain a ratio of about 2 to about 12 moles of ammonia and about 3 to about 26 moles of water per mole equivalent of epsilon-caprolactone in step (1).

5. A continuous two-stage process for producing epsilon-caprolactam from epsilon-caprolactone in high yield with minimum formation of by-products not convertible to epsilon-caprolactam under the process conditions which comprises (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 335° C. to about 370° C. and a pressure of from about 3,000 p.s.i.g. to about 5,000 p.s.i.g. for a period of about 20 minutes to about 90 minutes to thereby produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recycle and the rate of feed of the epsilon-caprolactone, ammonia and water being such as to maintain a ratio of about 2 to about 12 moles of ammonia and about 3 to about 26 moles of water per mole equivalent of epsilon-caprolactone in step (1).

6. A continuous two-stage process for producing epsilon-caprolactam from epsilon-caprolactone in high yield with minimum formation of by-products not convertible to epsilon-caprolactam under the process conditions which comprises (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 335° C. to about 370° C. and a pressure of from about 3,000 p.s.i.g. to about 5,000 p.s.i.g. for a period of about 20 minutes to about 90 minutes to thereby produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recycle and the rate of feed of the epsilon-caprolactone, ammonia and water being such as to maintain a ratio of about 3 to about 5 moles of ammonia and about 3 to about 26 moles of water per mole equivalent of epsilon-caprolactone in step (1).

7. A continuous two-stage process for producing epsilon-caprolactam from epsilon-caprolactone in high yield with minimum formation of by-products not convertible to epsilon-caprolactam under the process conditions which comprises (1) admixing epsilon-caprolactone, ammonia and water at a temperature of below about 200° C. and at a pressure at least equal to the autogenous pressure for a period of time sufficient to effect substantial conversion of the epsilon-caprolactone to reaction intermediates, (2) subjecting the reaction product of step (1) to a temperature of from about 335° C. to about 370° C. and a pressure of from about 3,000 p.s.i.g. to about 5,000 p.s.i.g. for a period of about 20 minutes to about 90 minutes to thereby produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recycle and the rate of feed of the epsilon-caprolactone, ammonia and water being such as to maintain a ratio of about 3 to about 5 moles of ammonia and about 5 to about 20 moles of water per mole equivalent of epsilon-caprolactone in step (1).

8. A continuous two-stage process for producing epsilon-caprolactam from epsilon-caprolactone in high yield with minimum formation of by-products not convertible to epsilon-caprolactam under the process conditions which comprises (1) admixing epsilon-caprolactone, ammonia and water at a temperature of below about 200° C. and at a pressure at least equal to the autogenous pressure for a period of time sufficient to produce an equilibrium reaction mixture, (2) subjecting said equilibrium reaction mixture to a temperature of from about 335° C. to about 370° C. and a pressure of from about 3,000 p.s.i.g. to about 5,000 p.s.i.g. for a period of about 20 minutes to about 90 minutes to thereby produce epsilon-caprolactam, (3) continuously recovering the epsilon-caprolactam from the reaction product of step (2) to leave a residue comprising ammonia, water and reaction intermediates, and (4) continuously recycling said residue for admixture in step (1), the rate of recycle and the rate of feed of the epsilon-caprolactaone, ammonia and water being such as to maintain a ratio of about 3 to about 5 moles of ammonia and about 5 to about 20 moles of water per mole equivalent of epsilon-caprolactone in step (1).

References Cited by the Examiner
UNITED STATES PATENTS
3,000,880   9/1961   Phillips et al. _____ 260—239.3

WALTER A. MODANCE, *Primary Examiner.*
ROBERT T. BOND, *Assistant Examiner.*